United States Patent
Ma et al.

(10) Patent No.: US 10,893,125 B2
(45) Date of Patent: *Jan. 12, 2021

(54) METHOD AND SERVER FOR ALLOCATING GAME RESOURCES

(71) Applicant: TENCENT TECHNOLOGY (SHENZHEN) COMPANY LIMITED, Shenzhen (CN)

(72) Inventors: Liang Ma, Shenzhen (CN); Jing Zhou, Shenzhen (CN); Zhiqiang He, Shenzhen (CN); Xuan Yu, Shenzhen (CN); Qi Li, Shenzhen (CN); Tao Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 137 days.

This patent is subject to a terminal disclaimer.

(21) Appl. No.: 16/005,082

(22) Filed: Jun. 11, 2018

(65) Prior Publication Data

US 2018/0295215 A1    Oct. 11, 2018

Related U.S. Application Data

(63) Continuation of application No. 14/463,589, filed on Aug. 19, 2014, now Pat. No. 10,021,215, which is a
(Continued)

(30) Foreign Application Priority Data

Feb. 23, 2012    (CN) .......................... 2012 1 0042385

(51) Int. Cl.
*H04L 29/06* (2006.01)
*H04L 29/08* (2006.01)
(Continued)

(52) U.S. Cl.
CPC .............. *H04L 67/42* (2013.01); *A63F 13/35* (2014.09); *H04L 47/50* (2013.01); *H04L 47/781* (2013.01);
(Continued)

(58) Field of Classification Search
CPC ......... H04L 12/14; H04L 43/04; H04L 67/22; G06F 15/16; G06F 16/00; G06F 2221/2109; G06F 2221/2133
(Continued)

(56) References Cited

U.S. PATENT DOCUMENTS 5,175,692 A * 12/1992 Mazouz ................. B65G 61/00
                                                                  414/900
6,203,433 B1      3/2001 Kume
(Continued)

FOREIGN PATENT DOCUMENTS

CN          1862547 A      11/2006
CN        101068194 A      11/2007
(Continued)

OTHER PUBLICATIONS

The National Institute for the Defense of Free Competition and the Protection of Intellectual Property (Indecopi) Office Action 1 for VVH 26-2018 Jun. 11, 2018 11 Pages (including translation).

*Primary Examiner* — Tesfay Yohannes
(74) *Attorney, Agent, or Firm* — Anova Law Group, PLLC

(57) ABSTRACT

The present invention discloses a method and a server for allocating game resources, which belongs to the field of network technology. The method includes: receiving a game participation request including game subzone information sent by a user; when the user enters a game subzone identified by the game subzone information, assigning the user to a waiting queue corresponding to the user in the
(Continued)

game subzone in accordance with a predetermined condition; and when the user is successfully assigned to the waiting queue, selecting participants to play in the same group with the user from waiting queues other than the waiting queue of the user, and allocating game resources for the user and the selected participants. The present technical solution can effectively reduce occurrence of the game participants' cheating.

18 Claims, 6 Drawing Sheets

Related U.S. Application Data continuation of application No. PCT/CN2013/071133, filed on Jan. 30, 2013.

(51) Int. Cl.
*A63F 13/35* (2014.01)
*H04L 12/863* (2013.01)
*H04L 12/911* (2013.01)

(52) U.S. Cl.
CPC ............ *H04L 67/10* (2013.01); *H04L 67/141* (2013.01); *H04L 67/306* (2013.01); *H04L 67/38* (2013.01)

(58) Field of Classification Search
USPC .......................................... 709/203; 370/412
See application file for complete search history.

(56) References Cited

U.S. PATENT DOCUMENTS

| | | | | |
|---|---|---|---|---|
| 6,470,386 | B1* | 10/2002 | Combar | G06F 11/0709 709/224 |
| 7,018,292 | B2* | 3/2006 | Tracy | G07F 17/32 273/269 |
| 7,023,864 | B2* | 4/2006 | Bennett | H04L 47/10 370/230 |
| 7,352,612 | B2* | 4/2008 | Hamberg | G06F 12/0238 365/158 |
| 8,177,628 | B2* | 5/2012 | Manning | G07F 17/34 463/21 |
| 8,210,931 | B2* | 7/2012 | Alderucci | G06Q 40/123 463/25 |
| 8,458,280 | B2* | 6/2013 | Hausauer | H04L 67/1097 709/212 |
| 8,589,541 | B2* | 11/2013 | Raleigh | H04M 15/44 709/224 |
| 8,639,625 | B1* | 1/2014 | Ginter | G06F 21/51 705/51 |
| 8,734,243 | B2 | 5/2014 | Harrington | |
| 8,758,109 | B2* | 6/2014 | Lutnick | G07F 17/3276 463/16 |
| 8,862,855 | B2* | 10/2014 | Li | G06F 12/0246 711/202 |
| 9,483,898 | B2* | 11/2016 | Davidson | G07F 17/3293 |
| 10,021,215 | B2* | 7/2018 | Ma | H04L 47/781 |
| 10,285,208 | B2* | 5/2019 | Schwartz | H04W 72/0406 |
| 2006/0019745 | A1 | 1/2006 | Benbrahim | |
| 2007/0126186 | A1 | 6/2007 | Crawford et al. | |
| 2007/0184904 | A1 | 8/2007 | Lee | |
| 2007/0226307 | A1 | 9/2007 | Bae et al. | |
| 2008/0026827 | A1 | 1/2008 | Skotarczak et al. | |
| 2008/0045335 | A1 | 2/2008 | Garbow et al. | |
| 2008/0224822 | A1 | 9/2008 | Gelman et al. | |
| 2008/0303811 | A1 | 12/2008 | Van | |
| 2010/0016081 | A1 | 1/2010 | Prochnow | |
| 2010/0035694 | A1 | 2/2010 | Losica | |
| 2010/0093443 | A1 | 4/2010 | Yan et al. | |
| 2011/0105093 | A1 | 5/2011 | Chang et al. | |
| 2011/0161423 | A1 | 6/2011 | Pratt et al. | |
| 2011/0173183 | A1 | 7/2011 | Dasdan et al. | |
| 2013/0079103 | A1 | 3/2013 | Nicely | |
| 2013/0083003 | A1 | 4/2013 | Perez et al. | |
| 2013/0130791 | A1 | 5/2013 | Myogan | |

FOREIGN PATENT DOCUMENTS

| | | | |
|---|---|---|---|
| CN | 102223373 | A | 10/2011 |
| EP | 2360631 | A1 | 8/2011 |
| JP | 2004113743 | A | 4/2004 |
| JP | 2009233268 | A | 10/2009 |
| KR | 1020010096091 | A | 11/2001 |
| KR | 1020070084720 | A | 8/2007 |
| KR | 1020080085102 | A | 9/2008 |
| WO | 2005045610 | A2 | 5/2005 |
| WO | 2007078372 | A2 | 7/2007 |

\* cited by examiner

METHOD AND SERVER FOR ALLOCATING GAME RESOURCES

CROSS-REFERENCE TO RELATED APPLICATIONS

This application is a continuation application of U.S. patent application Ser. No. 14/163,589, filed on Aug. 19, 2014, and now U.S. Pat. No. 10,021,215 issued on Jul. 10, 2018. U.S. patent application Ser. No. 14/463,589 know issued as U.S. Pat. No. 10,021,215 issued on Jul. 10, 2018) is a continuation of International Application No. PCT/CN2013/071133, filed on Jan. 30, 2013, which claims priority of a Chinese Application that was filed to State Intellectual Property Office of P.R.C. on Feb. 23, 2012 with Application No. 201210042385.9, and all contents thereof are incorporated therein in its entirety by reference.

TECHNICAL FIELD

The present invention relates to a field of network technology, and in particular to a method and a server for allocating game resources.

BACKGROUND

With rapid development of network technology, the online game gradually takes a great proportion in people's recreational life, and greatly enriches people's leisure and entertainment life. However, in game operations, the cheating behaviors of a minority of players will be encountered in the online game, especially in the online games with high interactivity where game players accumulate points by playing among game players, or in those where the game players pick up the bonus by completing playing tasks. For example, complains of the game player's cheating are often received in the present online games such as a game of Fight Landlord Happily.

In the prior technical solutions, the following two ways typically are employed to prevent the cheating behaviors of the game players:

In prior art one, a strategy of preventing cheating is embedded in a client, in which the embedded strategy can somewhat prevent the game players from cheating. However, if the strategy of preventing the game players from cheating embedded in the client is decoded by a user, it will need to upgrade the strategy for preventing cheating in the client, making a back-end server of the strategy for preventing cheating uncontrollable, and moreover, once the strategy of preventing cheating is malicious encoded, the cost for upgrading the client is also relatively high.

In prior art two, information communications are forbidden among the game players, such as forbidding the game player to see any information of the opposite side, or shielding any chat messages between the game players, etc. However, forbidding the information communication among the game players will make user experiences poor, thereby reducing market competitiveness of game products.

SUMMARY OF THE INVENTION

A method for allocating game resources is provided, the method including:

receiving a game participation request sent by a user, the game participation request including game subzone information;

when the user enters a game subzone identified by the game subzone information, assigning the user to a waiting queue that the user corresponds to in the game subzone in accordance with a predetermined condition; and when the user is successfully assigned to the waiting queue, selecting participant(s) to play in the same group with the user from waiting queue(s) other than the waiting queue of the user, and allocating game resources for the user and the selected participant(s).

A server is provided, the server including a receiving module, a queue assignment module and a participant assignment module; wherein the receiving module is adapted to receive a game participation request sent by the user, the game participation request including the game subzone information;

the queue assignment module is adapted to, when the user enters a game subzone identified by the game subzone information, assign the user to the waiting queue that the user corresponds to in the game subzone in accordance with a predetermined condition; and the participant assignment module is adapted to, when the user is successfully assigned to the waiting queue, select participant(s) to play in the same group with the user from waiting queue(s) other than the waiting queue of the user, and allocate game resources for the user and the selected participant(s).

A machine-readable medium is provided, the machine-readable medium having a set of instructions stored thereon, where when the set of instructions is executed, a machine is enabled to perform a method for allocating game resources, the method including:

receiving a game participation request sent by a user, the game participation request including game subzone information;

when the user enters a game subzone identified by the game subzone information, assigning the user to a waiting queue that the user corresponds to in the game subzone in accordance with a predetermined condition; and when the user is successfully assigned to the waiting queue, selecting participant(s) to play in the same group with the user from waiting queue(s) other than the waiting queue of the user, and allocating game resources for the user and the selected participant(s).

BRIEF DESCRIPTION OF ACCOMPANYING DRAWINGS

In order to more clearly illustrate the technical solution in the embodiments of the present invention, the drawings that need to use in the description of the embodiments will be briefly described hereinafter. Apparently, the drawings in the following description are merely some of the embodiments of the present invention, and for the person skilled in the art, other drawings can be obtained based on these drawings without making inventive labors.

DETAILED DESCRIPTIONS OF EMBODIMENTS OF THE INVENTION

In order to make the objects, the technical solution and the advantages of the present invention more apparent, a further detailed description of the embodiments of the present invention will be discussed with reference to the accompanying drawings.

Embodiment I

Figure 1:
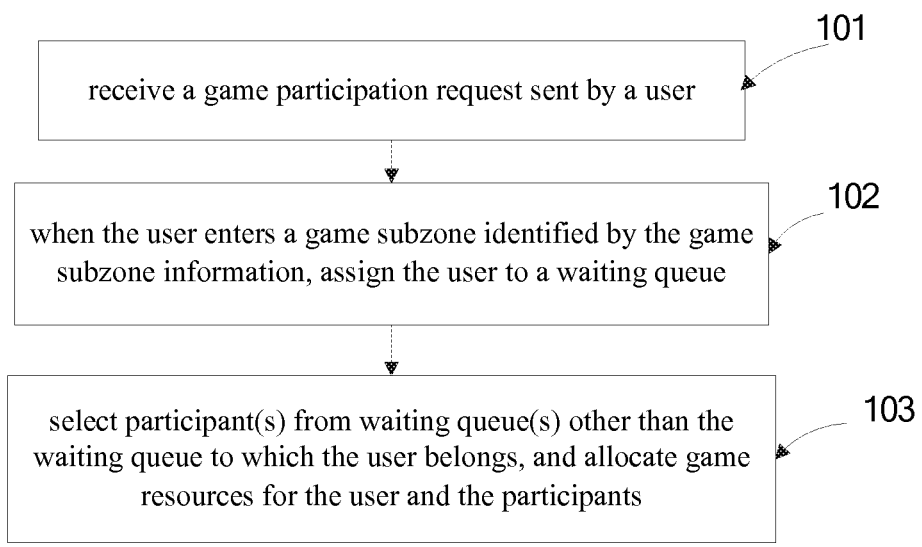
FIG. 1 is a flow diagram of a method for allocating game resources provided in Embodiment I of the present invention.

Referring to FIG. 1, a method for allocating game resources, which specifically may be performed by a cloud server, includes the following steps:

Step 101: receive a game participation request sent by a user, wherein, the game participation request includes game subzone information.

Step 102: when the user enters a game subzone identified by the game subzone information, assign the user to a waiting queue that the user corresponds to in the game subzone in accordance with a predetermined condition.

Step 103: when the user is successfully assigned to the waiting queue that the user corresponds to, select participant(s) to play in the same group with the user from waiting queue(s) other than the waiting queue to which the user belongs, and allocate game resources for the user and the participants selected to play in the same group with the user.

By the implementation of the technical solution of assigning the user to the corresponding waiting queue in accordance with the predetermined condition in the game subzone, and when the user is successfully assigned to the waiting queue that the user corresponds to, selecting the participant(s) to play in the same group with the user from the waiting queue(s) other than the waiting queue to which the user belongs in accordance with a specific algorithm, and allocating game resources for the user and the participants to play in the same group with the user, all users who participate in the game can come from different waiting queues, to some extent eliminating the possibility that the game participants know each other, thereby can effectively prevent the situation of the game participants' cheating.

Embodiment 2

Figure 2:
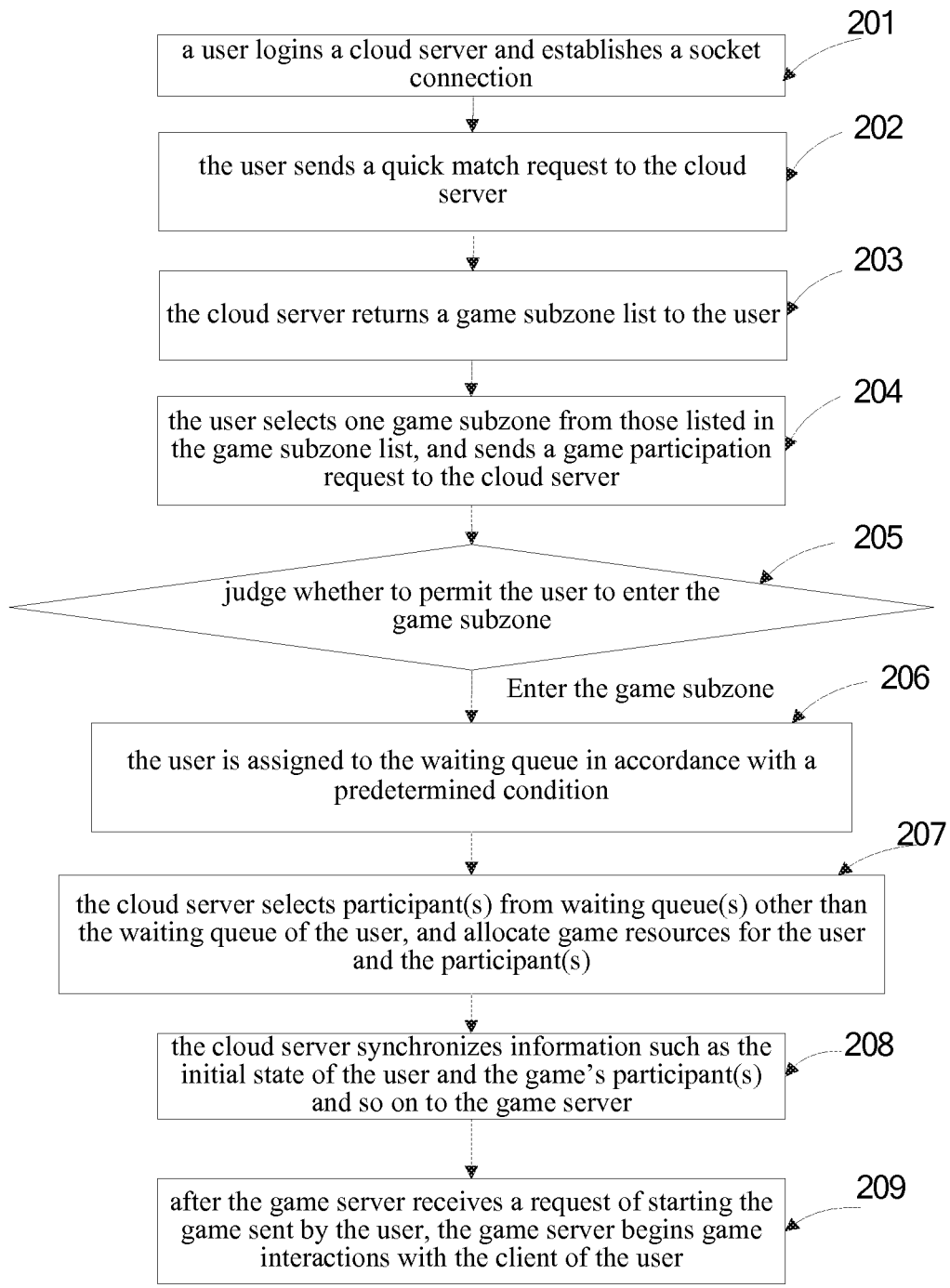
FIG. 2 is a flow diagram of a method for allocating game resources provided in Embodiment II of the present invention.

Referring to FIG. 2, a method for allocating resources specifically may be performed by a cloud server, the cloud server may integrate in a game server for implementation, and alternatively, may be implemented as independent from the game server, and when the cloud server is implemented as independent from the game server, the cloud server is connected with a client and the game server respectively over the network. The method includes the following steps:

Step 201: a user logins a cloud server, and establishes a socket connection with the cloud server.

In particular, the user starts a game application installed on the client, and inputs an account number and password to perform the operation of logging in the cloud server.

After receiving the account number and the password, the cloud server matches the account number with the password, and after a successful match is got, the cloud server returns to the user information such as a login Key value obtained upon a successful login, and the login Key value uniquely identities the identity of the user in a game.

Step 202: after the user establishes the socket connection with the cloud server, the user sends a quick match request to the cloud server.

Step 203: after the cloud server receives the quick match request sent by the user, the cloud server returns a game subzone list to the user.

Step 204: the user selects one game subzone from those listed in the game subzone list returned by the cloud server, and sends a game participation request to the cloud server, the game participation request containing the information of game subzone selected by the user, where the information of the game subzone may specifically be an ID, or a serial number or the like of a game subgroup, which is used for uniquely identifying the game subzone.

Step 205: the cloud server receives the game participation request sent by the user, judges whether to permit the user who sends the game participation request to enter the game subzone identified by the game subzone information.

When the user enters the game subzone identified by the game subzone information, Step 206 is performed.

When the user cannot enter the game subzone identified by the game subzone information, a message of failing to enter the game subzone is returned to the user, and after the user receives the message of failing to enter the game subzone, the user may reselect a game subzone according to the game subzone list returned by the cloud server, or end his operation.

In particular, the step of the cloud server receiving a game participation request sent by the user and judging whether to permit the user who sends the game participation request to enter the game subzone identified by the game subzone information includes:

checking whether the game subzone identified by the game subzone information has remaining space;

permitting the user to enter the game subzone identified by the game subzone information on the condition that the game subzone identified by the game subzone information has remaining space; and prohibiting the user from entering the game subzone identified by the game subzone information on the condition that there is no remaining space in the game subzone identified by the game subzone information.

Step 206: in the game subzone identified by the game subzone information, the user is assigned to the waiting queue that the user corresponds to in accordance with a predetermined condition.

Herein, the user may be assigned to the waiting queue that the user corresponds to in accordance with the predetermined condition by the following four methods:

In the first method, the predetermined condition is the time when the user enters the game subzone, so that the step of assigning the user to the waiting queue that the user corresponds to in accordance with the predetermined condition includes:

Determine a time segment to which the user correspondingly belongs according to the time when the user enters the game subzone.

Obtain the waiting queue that the time segment to which the user correspondingly belongs corresponds to according to a correspondence between pre-stored time segments and waiting queues.

In the embodiment of the present invention, the cloud server has already pre-constructed a plurality of waiting queues, separated a period of time (such as one day) into a plurality of successive time segments each of which corresponds to one waiting queue, and established and cached the correspondence between the time segments and the waiting queues. Thus, the cloud server can obtain the waiting queue that the time segment to which the user correspondingly belongs corresponds to by looking up the correspondence between the pre-stored time segments and the waiting queues.

Judge whether the obtained waiting queue has remaining space.

On the condition that the obtained waiting queue has remaining space, assign the user to the obtained waiting queue.

On the condition that there is no remaining space in the obtained waiting queue, return a message of failing to enter the game subzone to the user, so that after the user receives the message of failing to enter the game subzone, the user can reselect a game subzone according to the game subzone list returned by the cloud server, or end his operation.

In the second method, the predetermined condition is an Internet Protocol (IP) address being used when the user enters the game subzone, so that the step of assigning the user to the waiting queue that the user corresponds to in accordance with the predetermined condition includes:

Determine an IP address segment to which the user correspondingly belongs according to the IP address being used when the user enters the game subzone.

Obtain the waiting queue that the IP address segment to which the user correspondingly belongs corresponds to according to a correspondence between pre-stored IP address segments and waiting queues.

In the embodiment of the present invention, the cloud server has already pre-constructed a plurality of waiting queues, separated the IP address into a plurality of successive IP address segments each of which corresponds to a waiting queue, and established and cached the correspondence between the IP address segments and the waiting queues. Thus the cloud server can query the correspondence between the pre-stored IP address segments and the waiting queues according to the IP address segment to which the user correspondingly belongs, and judge whether the waiting queue that the IP address segment to which the user belongs corresponds to can be obtained by looking up the correspondence between the pre-stored IP address segments and the waiting queues. In the embodiment of the present invention, when the waiting queue that the user corresponds to cannot be obtained by looking up the correspondence between the pre-stored IP address segments and the waiting queues, preferably, the user is assigned to a reserved waiting queue, where the IP addresses of users in the reserved waiting queue may not be continuous, so as to reduce the failure rate of the user entering the waiting queue and increase the success rate of the user participating in the game. Accordingly, a message of failing to enter the game subzone can be returned to the user, so that after the user receives the message of failing to enter the game subzone, the user can reselect a game subzone according to the game subzone list returned by the cloud server, or end his operation.

Judge whether the obtained waiting queue has remaining space.

On the condition that the obtained waiting queue has remaining space, assign the user to the obtained waiting queue.

On the condition that there is no remaining space in the obtained waiting queue, return a message of failing to enter the game subzone to the user, so that after the user receives the message of failing to enter the game subzone, the user can reselect a game subzone according to the game subzone list returned by the cloud server, or end his operation.

In the third method, the predetermined condition is an Internet Protocol (IP) address being used when the user enters the game subzone, so that the step of assigning the user to the waiting queue that the user corresponds to in accordance with the predetermined condition includes:

Obtain a frequency of entering the game subzone that the Internet Protocol (IP) address being used when entering the game subzone corresponds to according to a correspondence between pre-stored IP addresses and frequencies of entering the game subzone.

Obtain the waiting queue that the obtained frequency of entering the game subzone corresponds to according to a correspondence between pre-stored frequency segments and waiting queues.

In the embodiment of the present invention, the cloud server can look up the correspondence between the pre-stored frequency segments and the waiting queues based on the obtained frequency of entering the game subzone, and determine whether the waiting queue that the obtained frequency of entering the game subzone corresponds to can be obtained by looking up the correspondence between the pre-stored frequency segments and the waiting queues, and when the waiting queue that the user corresponds to cannot be obtained by looking up the correspondence, preferably, the cloud server assigns the user to a reserved waiting queue, where the reserved waiting queue does not correspond to any of the frequencies of entering the game subzone, so as to reduce the failure rate of the user entering the waiting queue and increase the success rate of the user participating in the game. Accordingly, the cloud server may return a message of failing to enter the game subzone to the user, so that after the user receives the message of failing to enter the game subzone, the user can reselect a game subzone according to the game subzone list returned by the cloud server, or end his operation.

Judge whether the obtained waiting queue has remaining space.

On the condition that the obtained waiting queue has remaining space, assign the user to the obtained waiting queue.

On the condition that there is no remaining space in the obtained waiting queue, return a message of failing to enter the game subzone to the user, so that after the user receives the message of failing to enter the game subzone, the user can reselect a game subzone according to the game subzone list returned by the cloud server, or end his operation.

In the fourth method, the predetermined condition is a combination of the time when the user enters the game subzone and an Internet Protocol (IP) address being used when the user enters the game subzone, so that the step of assigning the user to the waiting queue that the user corresponds to in accordance with the predetermined condition includes:

Determine a time segment to which the user correspondingly belongs according to the time when the user enters the game subzone, and determine an IP address segment to which the user correspondingly belongs according to the IP address being used when the user enters the game subzone.

Obtain the waiting queue that the determined time segment and IP address segment corresponds to according to a correspondence between pre-stored time IP segments and waiting queues.

In the embodiment of the present invention, the cloud server can look up the correspondence between the pre-stored time IP segments and the waiting queues based on the determined time segment and the IP address segment, and judge whether the waiting queue that the determined time segment and the IP address segment correspond to can be obtained from the correspondence between the pre-stored time IP segments and the waiting queues, and when the waiting queue cannot be obtained by looking up the correspondence, preferably, the user can be assigned to a reserved waiting queue, where the reserved waiting queue does not correspond to any combination of the time segments and IP address segments, so as to reduce the failure rate of the user entering the waiting queue and increase the success rate of the users participating the game. Accordingly, the cloud server may return a message of failing to enter the game subzone to the user, so that after the user receives the message of failing to enter the game subzone, the user can reselect a game subzone according to the game subzone list returned by the cloud server, or end his operation.

Judge whether the obtained waiting queue has remaining space.

On the condition that the obtained waiting queue has remaining space, assign the user to the obtained waiting queue.

On the condition that there is no remaining space in the obtained waiting queue, return a message of failing to enter the game subzone to the user, so that after the user receives the message of failing to enter the game subzone, the user can reselect a game subzone according to the game subzone list returned by the cloud server, or end his operation.

Step 207: when the user is successfully assigned to the waiting queue that the user corresponds to, the cloud server selects participant(s) to play in the same group with the user from waiting queue(s) other than the waiting queue of the user in accordance with a specific algorithm, and allocate game resources for the user and the participant(s) to play in the same group with the user.

In particular, the step of selecting the participant(s) to play in the same group with the user from subgroup(s) other than the subgroup of the user in accordance with a specific algorithm includes:

Determine the number of the participant(s) to play in the same group with the user.

When specifically implementing the embodiment of the present invention, the number of the participant(s) to play in the same group with the user is determined, and is stored in a game information repository, thus, the cloud server can obtain the number of participants to play in the same group with the user by searching from the information repository locally stored.

Select the obtained number of waiting queue(s) from the waiting queue(s) other than the waiting queue of the user by employing a specific algorithm which may be a random or pseudo-random algorithm.

In the specific implementation of the embodiment of the present invention, the cloud server can select the obtained number of waiting queue(s) from the waiting queue(s) other than the waiting queue to which the user belongs by employing the random or pseudo-random algorithm commonly used in the prior art which will not be described in detail herein.

Select one waiting user from each of the obtained waiting queue(s) as a participant to play in the same group with the user.

Step 208: the cloud server synchronizes information such as the initial state of the user and the game's participant(s) and so on to the game server.

Step 209: after the game server receives a request of starting the game sent by the user, the game server begins game interactions with the client of the user.

In the embodiment of the present invention, during the game, upon receiving a request of checking the information of the game's participants or a chat request sent by the user, return the information of the game's participants or the chat information to the user, so that the user can check the information of the game's participants or the chat information at any time, so as to improve the users' usage experience.

In addition, in the embodiment of the present invention, when the game ends, an automatic group-switch instruction is sent to the user, and the user is reassigned to another waiting queue that the user corresponds to, so that participant(s) to play in the same group with the user can be reassigned for the user before the game is restarted.

In the embodiment of the present invention, by the implementation of the technical solution of assigning the user to the corresponding waiting queue in accordance with the predetermined condition in the game subzone, and when the user is successfully assigned to the waiting queue that the user corresponds to, selecting the participant(s) to play in the same group with the user in accordance with the specific algorithm from the waiting queue(s) other than the waiting queue to which the user belongs, and allocating game resources for the user and the participant(s) to play in the same group with the user, all users participating in the game can come from different waiting queues, to some extent eliminating the possibility that game participants know each other, thereby the situation of the game participants' cheating can be prevented.

In the embodiment of the present invention, the cloud server randomly assigns game participant(s) for the user, as the function and the operating speed of the cloud server are higher than the client, it can reduce the operation difficulty of the product.

Furthermore, the method for preventing cheating of the cloud server matches seamlessly with the client of the user, and the method for preventing cheating is implemented in the cloud server, so it does not need to upgrade the client when altering the strategy, thereby reducing occurrence of the situation of sacrificing one for the other and increasing the stability of the product.

Embodiment III

Figure 3:
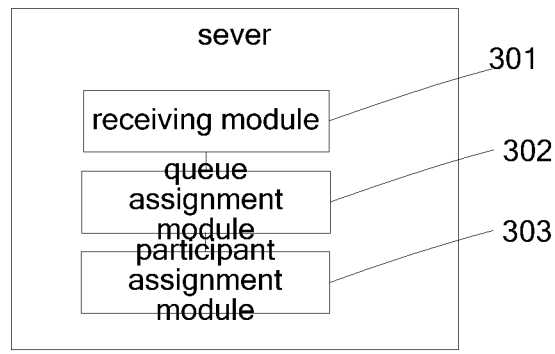
FIG. 3 is a schematic diagram of a structure of a server provided in Embodiment III of the present invention.

Referring to FIG. 3, a server, which specifically may be the same as the cloud server of Embodiment II of the method, includes a receiving module 301, a queue assignment module 302 and a participant assignment module 303.

The receiving module 301 is adapted for receiving a game participation request sent by the user, the game participation request containing game subzone information.

The queue assignment module 302 is adapted for, when the user enters the game subzone identified by the game subzone information, in the game subzone, assigning the user to the waiting queue that the user corresponds to in accordance with a predetermined condition.

The participant assignment module 303 is adapted for, when the user is successfully assigned to the waiting queue that the user corresponds to, selecting the participant(s) to play in the same group with the user from waiting queue(s) other than the waiting queue to which the user belongs, and allocating game resources for the user and the participant(s) to play in the same group with the user.

Figure 4:
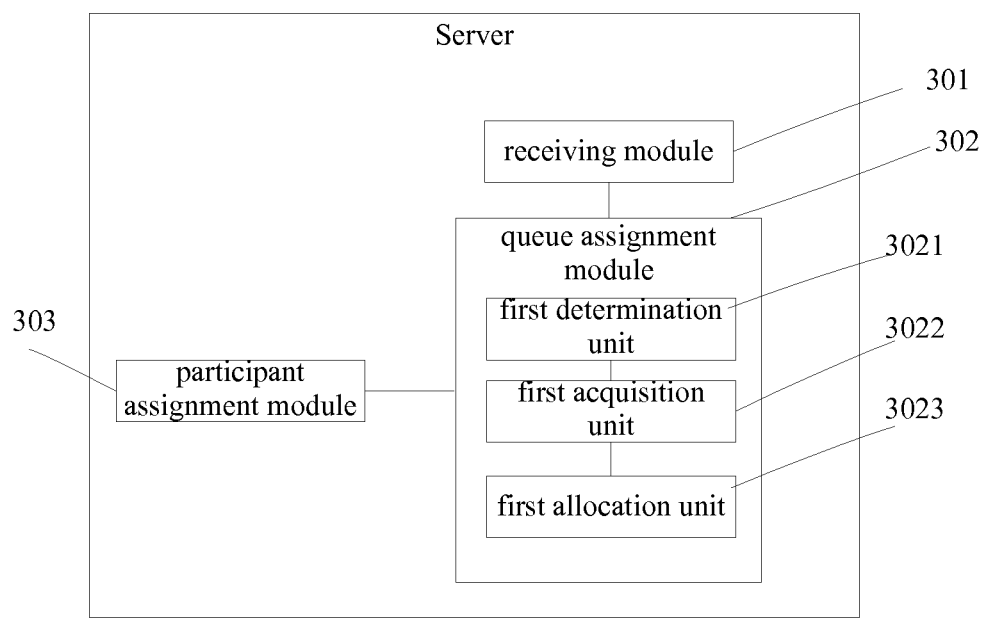
FIG. 4 is a schematic diagram of the structure of a server provided in Embodiment III of the present invention.

Referring to FIG. 4, the queue assignment module 302 shown in FIG. 3 of the embodiment of the present invention may include the following:

The first determination unit 3021 is adapted for, on the condition that the predetermined condition is the time when the user enters the game subzone, determining the time segment to which the user correspondingly belongs according to the time when the user enters the game subzone.

The first acquisition unit 3022 is adapted for obtaining the waiting queue that the time segment to which the user correspondingly belongs corresponds to according to a correspondence between pre-stored time segments and waiting queues.

The first assignment unit 3023 is adapted for judging whether the obtained waiting queue has remaining space, and on the condition that the obtained waiting queue has remaining space, assigning the user to the obtained waiting queue.

Figure 5:
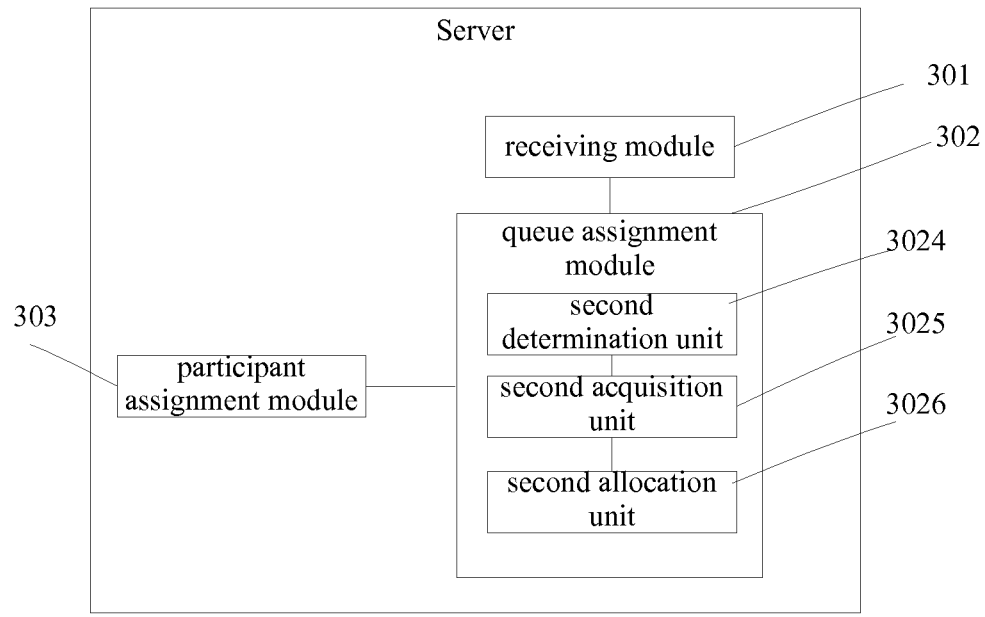
FIG. 5 is a schematic diagram of a structure of a server provided in Embodiment III of the present invention.

Referring FIG. 5, the queue assignment module 302 shown in FIG. 3 of the embodiment of the present invention may alternatively include the following:

The second determination unit 3024 is adapted for, on the condition that the predetermined condition is an Internet Protocol (IP) address being used when the user enters the game subzone, determining the IP address segment to which the user correspondingly belongs according to the IP address being used when the user enters the game subzone.

The second acquisition unit 3025 is adapted for obtaining the waiting queue that the IP address segment to which the user correspondingly belongs corresponds to according to a correspondence between pre-stored IP address segments and waiting queues.

The second assignment unit 3026 is adapted for judging whether the obtained waiting queue has remaining space, and on the condition that the obtained waiting queue has remaining space, assigning the user to the obtained waiting queue.

Figure 6:
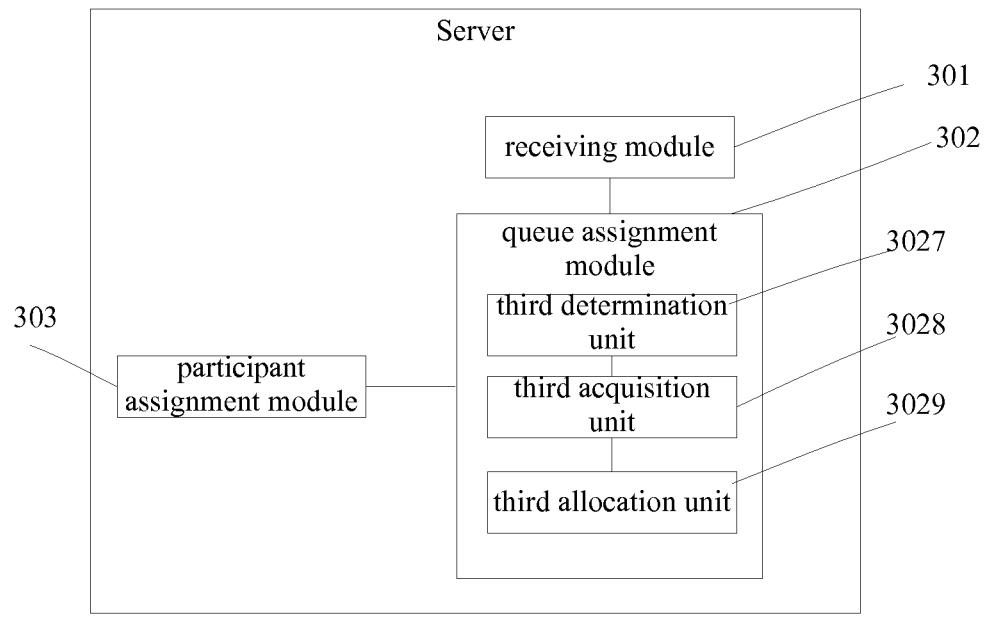
FIG. 6 is a schematic diagram of a structure of a server provided in Embodiment III of the present invention.

Referring to FIG. 6, the queue assignment module 302 shown in FIG. 3 of the embodiment of the present invention may alternatively include the following:

The third determination unit 3027 is adapted for, on the condition that the predetermined condition is an Internet Protocol (IP) address being used when the user enters the game subzone, obtaining a frequency of entering the game subzone that the Internet Protocol (IP) address being used when entering the game subzone corresponds to according to a correspondence between pre-stored IP addresses and frequencies of entering the game subzone.

The third obtaining unit 3028 is adapted for obtaining the waiting queue that the obtained frequency of entering the game subzone corresponds to according to a correspondence between pre-stored frequency segments and waiting queues.

The third assignment unit 3029 is adapted for judging whether the obtained waiting queue has remaining space, and on the condition that the obtained waiting queue has remaining space, assigning the user to the obtained waiting queue.

Figure 7:
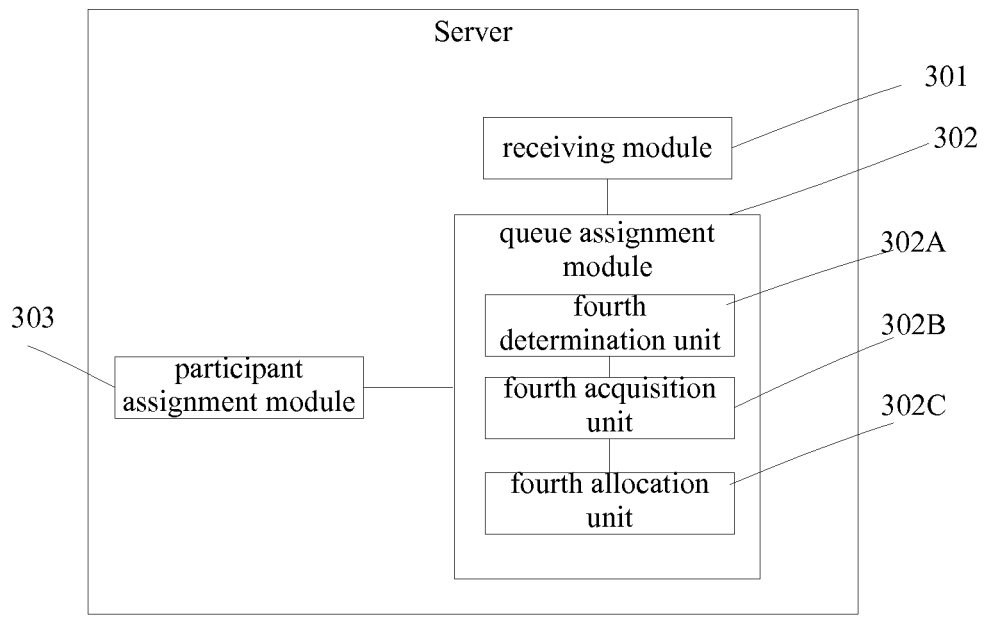
FIG. 7 is a schematic diagram of a structure of a server provided in Embodiment III of the present invention.

Referring to FIG. 7, the queue assignment module 302 shown in FIG. 3 of the embodiment of the present invention may alternatively include the following:

The fourth determination unit 302A is adapted for, on the condition that the predetermined condition is a combination of the time when the user enters the game subzone and an Internet Protocol (IP) address being used when the user enters the game subzone, determining a time segment to which the user correspondingly belongs according to the time when the user enters the game subzone, and determining the IP address segment to which the user correspondingly belongs according to the IP address being used when the user enters the game subzone.

The fourth acquisition unit 302B is adapted for obtaining the waiting queue that the determined time segment and IP address segment corresponds to according to a correspondence between pre-stored time IP segments and waiting queues.

The fourth assignment unit 302C is adapted for judging whether the obtained waiting queue has remaining space, and on the condition that the obtained waiting queue has remaining space, assigning the user to the obtained waiting queue.

Figure 8:
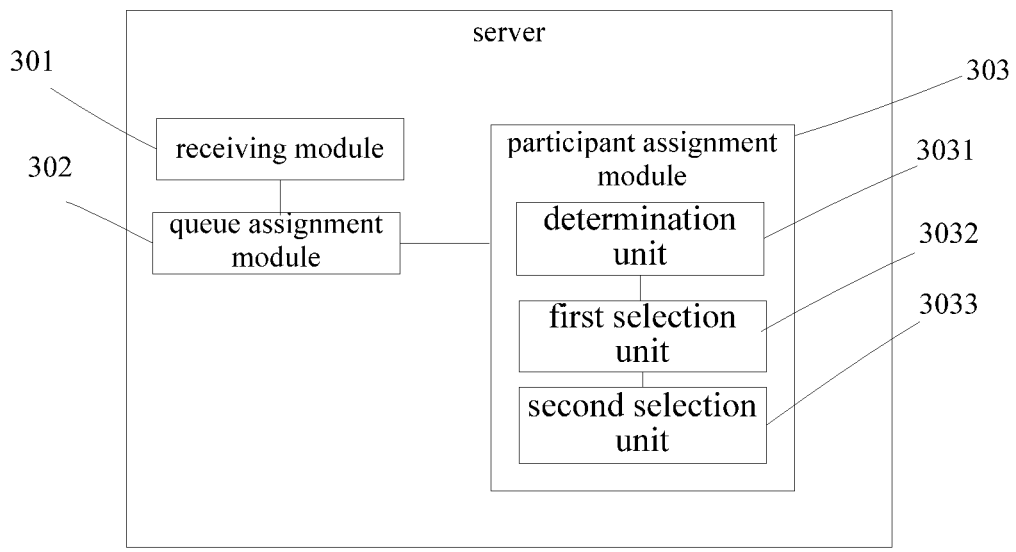
FIG. 8 is a schematic diagram of a structure of a server provided in Embodiment III of the present invention.

Referring to FIG. 8, the participant assignment module 303 shown in FIG. 3 of the embodiment of the present invention may include the following:

A determination unit 3031 is adapted for determining the number of participant(s) to play in the same group with the user.

A first selection unit 3032 is adapted for selecting the obtained number of waiting queue(s) by employing a specific algorithm from waiting queue(s) other than the waiting queue to which the user belongs, where the specific algorithm is a random or pseudo-random algorithm.

A second selection unit 3033 is adapted for respectively selecting one waiting user from each of the obtained waiting queue(s) as a participant to play in the same group with the user.

Figure 9:
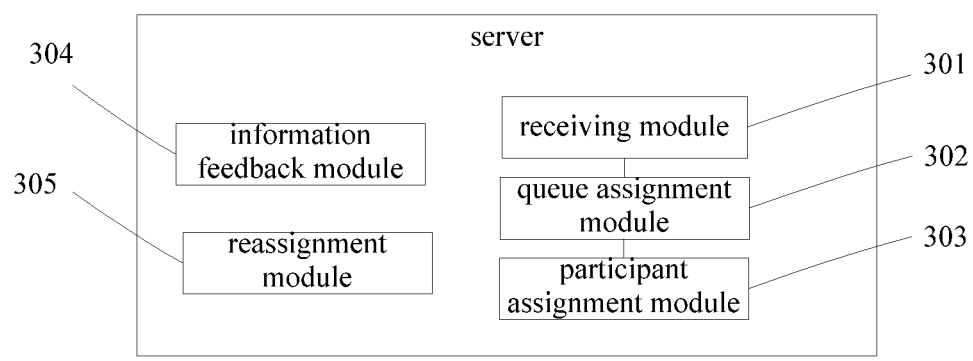
FIG. 9 is a schematic diagram of a structure of a server provided in Embodiment III of the present invention.

Referring to FIG. 9, the server shown in FIG. 3 of the embodiment of the present invention further includes the following:

An information feedback module 304 is adapted for, upon receiving a request for checking information of a game's participant(s) or a chat request during the game, returning the information of the game's participant(s) or the chat information to the user, so that the user can check the information of the game's participant(s) or the chat information at any time; or/and, A reassignment module 305 is adapted for sending an automatic group-switch instruction to the user, and reassigning the user to another waiting queue that the user corresponds to when the game ends, in order to reassign participant(s) to play in the same group with the user for the user before the game is restarted.

In the embodiment of the present invention, by the implementation of the technical solution of assigning the user to the corresponding waiting queue in accordance with the predetermined condition in the game subzone, and when the user is successfully assigned to the waiting queue that the user corresponds to, selecting the participant(s) to play in the same group with the user in accordance with the specific algorithm from the waiting queue(s) other than the waiting queue to which the user belongs, and allocating game resources for the user and the participant(s) to play in the same group with the user, all users participating in the game can come from different waiting queues, to some extent eliminating the possibility that game participants know each other, thereby the situation of the game participants' cheating can be prevented.

In the embodiment of the present invention, the cloud server randomly assigns game participant(s) for the user, as the function and the operating speed of the cloud server are higher than the client, it can reduce the operation difficulty of the product.

Furthermore, the method for preventing cheating of the cloud server matches seamlessly with the client of the user, and the method for preventing cheating is implemented in the cloud server, so it does not need to upgrade the client when altering the strategy, thereby reducing occurrence of the situation of sacrificing one for the other and increasing the stability of the product.

The embodiment of the present invention provides a machine-readable medium, having a set of instructions stored thereon, and when the set of instructions is executed, a machine is enabled to perform a method for allocating game resources, the method including:

receiving a game participation request sent by a user, the game participation request including game subzone information;

when the user enters a game subzone identified by the game subzone information, assigning the user to a waiting queue that the user corresponds to in the game subzone in accordance with a predetermined condition; and when the user is successfully assigned to the waiting queue that the user corresponds to, selecting participant(s) to play in the same group with the user from waiting queue(s) other than the waiting queue of the user, and allocating game resources for the user and the participant(s) to play in the same group with the user.

Based on the above description of the embodiments, those skilled in the art can clearly understand that the present invention can be accomplished through a software plus hardware platform, and of course it can be accomplished via hardware, but, in many cases, the former is preferred. The subject-matter of the technical solution of the present invention or the part that makes a contribution to the prior art can be represented in a form of a software product, and the computer software product is stored in a storage medium, such as a floppy disk, a hard disk, an optical disk or the like in a computer, including several instructions of the above-mentioned method which is to cause a computing device (which may be a personal computer, a server, a network device or etc.,) to execute the method according to various embodiments of the present invention, or to configure a universal hardware device as the device of the present invention, so as to implement the schemes mentioned in various embodiments of the present invention. The universal hardware device includes a memory, such as ROM/RAM etc., for storing instructions, and a processor, such as CPU, coupled with the memory and configured to execute the instructions stored in the memory.

The above described are only the preferred embodiments of the present invention, and are not intended to limit the present invention, and any modifications, equivalent replacements and improvements within the spirit and principle of the present invention should be included within the protection scope of the present invention.

What is claimed is:

1. A method for allocating game resources, comprising:
   receiving, by a game server, a game participation request from a user, wherein the game participation request includes game subzone information corresponding to a game subzone the user requests to enter, wherein receiving the game participation request includes:
   establishing a socket connection to a cloud server;
   sending a match request to the cloud server;
   generating by the cloud server a game subzone list according to the match request;
   sending by the cloud server the game subzone list to the user; and
   selecting from the game subzone list the game subzone the user requests to enter;
   assigning, by the game server, the user to a first waiting queue according to a time of the game participation request from the user, comprising:
   determining a first time segment the user belongs to, according to the time of the game participation request from the user;
   obtaining, according to a pre-stored mapping relationship between time segments and waiting queues, the first waiting queue associated with the first time segment the user belongs to; and
   assigning the user to the first waiting queue when the first waiting queue has remaining space;
   selecting, by the game server, a participant from a second waiting queue different than the first waiting queue of the user, to play a game in a same group with the user, the second waiting queue corresponding to a second time segment in the pre-stored mapping relationship, the second time segment being different than the first time segment; and
   allocating game resources for the user and the participant, wherein the user and the participant are from different waiting queues, and wherein the user and the participant are unknown to each other prior to the game.

2. The method according to claim 1, wherein before assigning the user to the first waiting queue when the first waiting queue has remaining space, further comprises:
   judging whether the first waiting queue has remaining space;
   when the first waiting queue has remaining space, permitting the user to enter the game subzone; and
   when the first waiting queue has no remaining space, prohibiting the user to enter the game subzone and returning a message of failing to enter the game subzone.

3. The method according to claim 1, wherein assigning, by the game server, the user to the first waiting queue according to the time of the game participation request from the user, further comprises:
   assigning the user to the first waiting queue according to an Internet Protocol (IP) address used by the user when sending the game participation request.

4. The method according to claim 3, wherein assigning the user to the first waiting queue when the first waiting queue has remaining space, comprises:
   determining an IP address segment according to the IP address used by the user when the user enters the game subzone;
   obtaining the first waiting queue according to a pre-stored mapping relationship between IP address segments and the waiting queues and the pre-stored mapping relationship between the time segments and the waiting queues; and
   assigning the user to the first waiting queue when the first waiting queue has remaining space.

5. The method according to claim 3, wherein assigning, by the game server, the user to the first waiting queue according to the time of the game participation request from the user, further comprises:
   obtaining a frequency segment according to a frequency of entering the game subzone through the IP address used by the user when sending the game participation request;

obtaining the first waiting queue according to a pre-stored mapping relationship between frequency segments and the waiting queues and the pre-stored mapping relationship between the time segments and the waiting queues; and assigning the user to the first waiting queue when the first waiting queue has remaining space.

6. The method according to claim 1, wherein the participant includes a first participant waiting at a first-participant-waiting queue and a second participant waiting at a second-participant-waiting queue different than the first-participant-waiting queue according to the pre-stored mapping relationship, the method further comprising:

respectively selecting the first participant and the second participant to play the game in the same group with the user.

7. A server, comprising: a memory; and a processor coupled to the memory, wherein the processor is configured to:

receive a game participation request from a user, wherein the game participation request includes game subzone information corresponding to a game subzone the user requests to enter, wherein to receive the game participation request includes:
establishing a socket connection to a cloud server;
sending a match request to the cloud server;
generating by the cloud server a game subzone list according to the match request;
sending by the cloud server the game subzone list to the user; and
selecting from the game subzone list the game subzone the user requests to enter;

assign the user to a first waiting queue according to a time of the game participation request from the user, comprising:
determine a first time segment the user belongs to, according to the time of the game participation request from the user;
obtain, according to a pre-stored mapping relationship between time segments and waiting queues, the first waiting queue associated with the first time segment the user belongs to; and
assign the user to the first waiting queue when the first waiting queue has remaining space;

select a participant from second waiting queue different than the first waiting queue of the user, to play a game in a same group with the user, the second waiting queue corresponding to a second time segment in the pre-stored mapping relationship, the second time segment being different than the first time segment; and allocate game resources for the user and the participant, wherein the user and the participant are from different waiting queues, and wherein the user and the participant are unknown to each other prior to the game.

8. The server according to claim 7, wherein the processor is further configured to:
judge whether the first waiting queue has remaining space;
when the first waiting queue has remaining space, permit the user to enter the game subzone; and
when the first waiting queue has no remaining space, prohibit the user to enter the game subzone and returning a message of failing to enter the game subzone.

9. The server according to claim 7, wherein the processor is further configured to:

assign the user to the first waiting queue according to an Internet Protocol (IP) address used by the user when sending the game participation request.

10. The server according to claim 9, wherein the processor is further configured to:
determine an IP address segment according to the IP address used by the user when the user enters the game subzone;
obtain the first waiting queue according to a pre-stored mapping relationship between IP address segments and the waiting queues and the pre-stored mapping relationship between the time segments and the waiting queues; and
assign the user to the first waiting queue when the first waiting queue has remaining space.

11. The server according to claim 9, wherein the processor is further configured to:
obtain a frequency segment according to a frequency of entering the game subzone through the IP address used by the user when sending the game participation request;
obtain the first waiting queue according to a pre-stored mapping relationship between frequency segments and the waiting queues and the pre-stored mapping relationship between the time segments and the waiting queues; and
assign the user to the first waiting queue when the first waiting queue has remaining space.

12. The server according to claim 7, wherein the participant includes a first participant waiting at a first-participant-waiting queue and a second participant waiting at a second-participant-waiting queue different than the first-participant-waiting queue according to the pre-stored mapping relationship, and wherein the processor is further configured to:
respectively select the first participant and the second participant to play the game in the same group with the user.

13. A non-transitory computer-readable medium having a computer program for, when being executed by a processor, performing a method, the method comprising:
receiving, by a game server, a game participation request from a user, wherein the game participation request includes game subzone information corresponding to a game subzone the user requests to enter, wherein receiving the game participation request includes:
establishing a socket connection to a cloud server;
sending a match request to the cloud server;
generating by the cloud server a game subzone list according to the match request;
sending by the cloud server the game subzone list to the user; and selecting from the game subzone list the game subzone the user requests to enter;
assigning, by the game server, the user to a first waiting queue according to a time of the game participation request from the user, comprising:
determining a first time segment the user belongs to, according to the time of the game participation request from the user;
obtaining, according to a pre-stored mapping relationship between time segments and waiting queues, the first waiting queue associated with the first time segment the user belongs to; and
assigning the user to the first waiting queue when the first waiting queue has remaining space;
selecting, by the game server, a participant from a second waiting queue different than the first waiting queue of the user, to play a game in a same group with the user, the second waiting queue corresponding to a second time segment in the pre-stored mapping relationship, the second time segment being different than the first time segment; and allocating game resources for the user and the participant, wherein the user and the participant are from different waiting queues, and wherein the user and the participant are unknown to each other prior to the game.

14. The non-transitory computer-readable medium according to claim 13, wherein before assigning the user to the first waiting queue when the first waiting queue has remaining space, further comprises:

judging whether the first waiting queue has remaining space;

when the first waiting queue has remaining space, permitting the user to enter the game subzone; and when the first waiting queue has no remaining space, prohibiting the user to enter the game subzone and returning a message of failing to enter the game subzone.

15. The non-transitory computer-readable medium according to claim 13, wherein assigning, by the game server, the user to the first waiting queue according to the time of the game participation request from the user, further comprises:

assigning the user to the first waiting queue according to an Internet Protocol (IP) address used by the user when sending the game participation request.

16. The non-transitory computer-readable medium according to claim 15, wherein assigning the user to the first waiting queue when the first waiting queue has remaining space, comprises:

determining an IP address segment according to the IP address used by the user when the user enters the game subzone;

obtaining the first waiting queue according to a pre-stored mapping relationship between IP address segments and the waiting queues and the pre-stored mapping relationship between the time segments and the waiting queues; and assigning the user to the first waiting queue when the first waiting queue has remaining space.

17. The non-transitory computer-readable medium according to claim 15, wherein assigning, by the game server, the user to the first waiting queue according to the time of the game participation request from the user, further comprises:

obtaining a frequency segment according to a frequency of entering the game subzone through the IP address used by the user when sending the game participation request;

obtaining the first waiting queue according to a pre-stored mapping relationship between frequency segments and the waiting queues and the pre-stored mapping relationship between the time segments and the waiting queues; and assigning the user to the first waiting queue when the first waiting queue has remaining space.

18. The non-transitory computer-readable medium according to claim 13, wherein the participant includes a first participant waiting at a first-participant-waiting queue and a second participant waiting at a second-participant-waiting queue different than the first-participant-waiting queue according to the pre-stored mapping relationship, the method further comprising:

respectively selecting the first participant and the second participant to play the game in the same group with the user.

* * * * *